(12) United States Patent
Manivannan et al.

(10) Patent No.: US 7,270,773 B2
(45) Date of Patent: Sep. 18, 2007

(54) QUANTUM-SPLITTING FLUORIDE-BASED PHOSPHORS, METHOD OF PRODUCING, AND RADIATION SOURCES INCORPORATING SAME

(75) Inventors: Venkatesan Manivannan, Rexford, NY (US); Alok Mani Srivastava, Niskayuna, NY (US); Holly Ann Comanzo, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 293 days.

(21) Appl. No.: 11/032,910

(22) Filed: Jan. 10, 2005

(65) Prior Publication Data
US 2006/0151747 A1  Jul. 13, 2006

(51) Int. Cl.
*C09K 11/85* (2006.01)
(52) U.S. Cl. ............... 252/301.4 H; 313/467; 313/468; 313/486; 313/487
(58) Field of Classification Search ........ 252/301.4 H; 313/467, 468, 486, 487
See application file for complete search history.

(56) References Cited

U.S. PATENT DOCUMENTS

| | | | | |
|---|---|---|---|---|
| 6,600,260 B2* | 7/2003 | Feldmann et al. | ........... | 313/486 |
| 2002/0185961 A1* | 12/2002 | Oskam et al. | ............... | 313/486 |
| 2002/0190645 A1* | 12/2002 | Oskam et al. | ............... | 313/568 |

FOREIGN PATENT DOCUMENTS

| | | | |
|---|---|---|---|
| JP | 07-315992 | * | 12/1995 |
| JP | 11-43669 | * | 2/1999 |
| WO | WO 02/097859 | * | 12/2002 |

OTHER PUBLICATIONS

Karbowiak et al, "Structural and luminescent properties of nanostructured KGdF4:Eu3+ synthesised by coprecipitation method", Jor alloy and compound, vol. 380 (1-2), pp. 321-326, Apr. 8, 2004.*

You et al, "VUV excited luminescence of MGdF4:Eu3+ (M=Na,K,NH4)", Jour Lumine, vol. 110 (3), pp. 95-99, Jun. 17, 2004.*

Wegh, R. T., et al., "Visible quantum cutting in Eu3+ -doped gadolinium florides via downconversion", Journal of Luminescence, 1999, pp. 93-104, vol. 82.

Kondo, H., et al., "Dynamical behavior of quantum cutting in alkali gadolinium fluoride phosphors", Journal of Luminescence, 2004, pp. 59-63, vol. 108.

Khaidukov, N. M., et al., "Luminescence spectroscopy from the vacuum ultra-violet to the visible for Er3+ and Tm3+ in complex fluoride cyrstals", Optical Materials, 2002, pp. 365-376, vol. 19.

(Continued)

*Primary Examiner*—C. Melissa Koslow
(74) *Attorney, Agent, or Firm*—Jason Klindtworth; Jean K. Testa

(57) ABSTRACT

A quantum-splitting fluoride-based phosphor comprises gadolinium, at least a first alkali metal, and a rare-earth metal activator. The phosphor is made in a solid-state method without using HF gas. The phosphor can be used alone or in conjunction with other phosphors in light sources and displays wherein it can be excited by VUV radiation, and increases the efficiency of these devices.

17 Claims, 14 Drawing Sheets

OTHER PUBLICATIONS

Wegh, R. T., et al., "Visible quantum cutting via downconversion in LiGdF4: Er3+, Tb3+ upon Er3+ 4f11→4f10 5d excitation", Journal of Luminescence, 2000, pp. 111-122, vol. 90.

Oskam, K.D., et al., "Downconversion: a new route to visible quantum cutting", Journal of Alloys and Compounds, 2000, pp. 421-425, vol. 300-301.

Wegh, R. T., et al., "Quantum cutting through downconversion in rare-earth compounds", Journal of Luminescence, 2000, pp. 1017-1019, vol. 87-89.

Feldman, C., et al., "Quantum efficiency of down-conversion phosphor LiGdF4: Eu", Journal of Luminescence, 2001, pp. 245-254, vol. 92.

Liu, Bo, et al., "visible quantum cutting in BaF2; Gd, Eu via downconversion", Journal of Luminescence, 2003, pp. 155-159, vol. 101.

* cited by examiner

QUANTUM-SPLITTING FLUORIDE-BASED PHOSPHORS, METHOD OF PRODUCING, AND RADIATION SOURCES INCORPORATING SAME

BACKGROUND

This invention relates to oxide-based materials that have one application as phosphors. More particularly, the phosphors are aluminates or borates doped with $Pr^{3+}$ and exhibit quantum splitting when irradiated with vacuum ultraviolet ("VUV") radiation. This invention also relates to a method of making such quantum-splitting phosphors.

The conversion of a single ultraviolet ("UV") photon into two visible photons with the result that the quantum efficiency of luminescence exceeds unity is termed quantum splitting. Quantum splitting materials are very desirable for use as phosphors for lighting applications, such as fluorescent lamps. A suitable quantum splitting phosphor can, in principle, produce a significantly brighter fluorescent light source due to higher overall luminous output because it can convert to visible light the part of UV radiation that is not absorbed efficiently by traditional phosphors currently used in commercial fluorescent lamps. Quantum splitting has been demonstrated previously in fluoride- and oxide-based materials. A material comprising 0.1% $Pr^{3+}$ in a matrix of $YF_3$ has been shown to generate more than one visible photon for every absorbed UV photon when excited with radiation having a wavelength of 185 nm. The measured quantum efficiency of this material was 140%, and thus greatly exceeded unity. However, some fluoride-based compounds in the art do not have sufficient stability to permit their use as phosphors in fluorescent lamps because they are known to react with mercury vapor that is used in such lamps to provide the UV radiation and form materials that do not exhibit quantum splitting. Other fluoride-based phosphors require the use of relatively expensive materials. In addition, producing fluoride-based materials presents a great practical challenge because it may involve the use of large quantities of highly reactive and toxic fluorine-based materials.

Therefore, there is a continued need to provide quantum-splitting phosphors that have higher quantum efficiency in the visible range than the prior-art quantum splitting materials. It is also desirable to provide more energy-efficient light sources using quantum-splitting phosphors having higher quantum efficiency. It is further desirable to provide simple methods for making materials having high quantum-splitting capability.

SUMMARY OF THE INVENTION

The present invention provides fluoride-based phosphors comprising gadolinium and at least a first alkali metal selected from the group consisting of potassium, rubidium, cesium, and combinations thereof. A phosphor of the present invention is activated with at least one type of rare-earth ions other than gadolinium.

In one embodiment, the phosphor is activated with rare-earth ions selected from the group consisting of ions of europium, terbium, dysprosium, samarium, thulium, holmium, and combinations thereof.

In another embodiment, a portion of the first alkali metal is substituted with at least a second alkali metal different from the first alkali metal.

In still another embodiment, the phosphor also comprises a sensitizer selected from the group consisting of V, Nb, W, Zr, Hf, Sb, Ge, Sn, Bi, Ga, Zn, In, Cu, Ag, Er, Tm, Pr, and combinations thereof. In still another embodiment, the sensitizer replaces a portion of gadolinium.

A phosphor of the present invention exhibits quantum splitting when irradiated with VUV radiation. VUV radiation as used herein is radiation having wavelength shorter than about 215 nm. The phosphors of the present invention may be used in mercury vapor discharge lamps to provide energy-efficient light sources.

In another aspect of the present invention, a fluoride-based phosphor has a formula of $AGdF_4$:RE, wherein A is selected from the group consisting of K, Rb, Cs, and combinations thereof; and RE is at least an activator of the type of rare-earth metals.

In another aspect of the present invention, a portion of A is substituted with at least another alkali metal different from A.

The present invention also provides a method of making improved quantum-splitting fluoride-based phosphors. The method comprises the steps of: (a) selecting a desired final composition of the phosphor; (b) providing quantities of: (1) a fluoride of at least an alkali metal selected from the group consisting of K, Rb, Cs, and combinations thereof; (2) fluoride of gadolinium; and (3) at least a fluoride of a rare-earth metal, which rare-earth metal acts as an activator of the final phosphor, and which quantities are sufficient to achieve the final composition of the phosphor; and (b) heating the fluorides under a vacuum or an inert atmosphere at a temperature for a time sufficient to convert the fluorides to the phosphor.

In still another aspect, light sources are provided that comprise a fluoride-phosphor of the present invention and a source of VUV radiation.

Other benefits of this invention may become evident by a perusal of the description and appended claims together with the attached drawings.

DETAILED DESCRIPTION OF THE INVENTION

Figure 1:
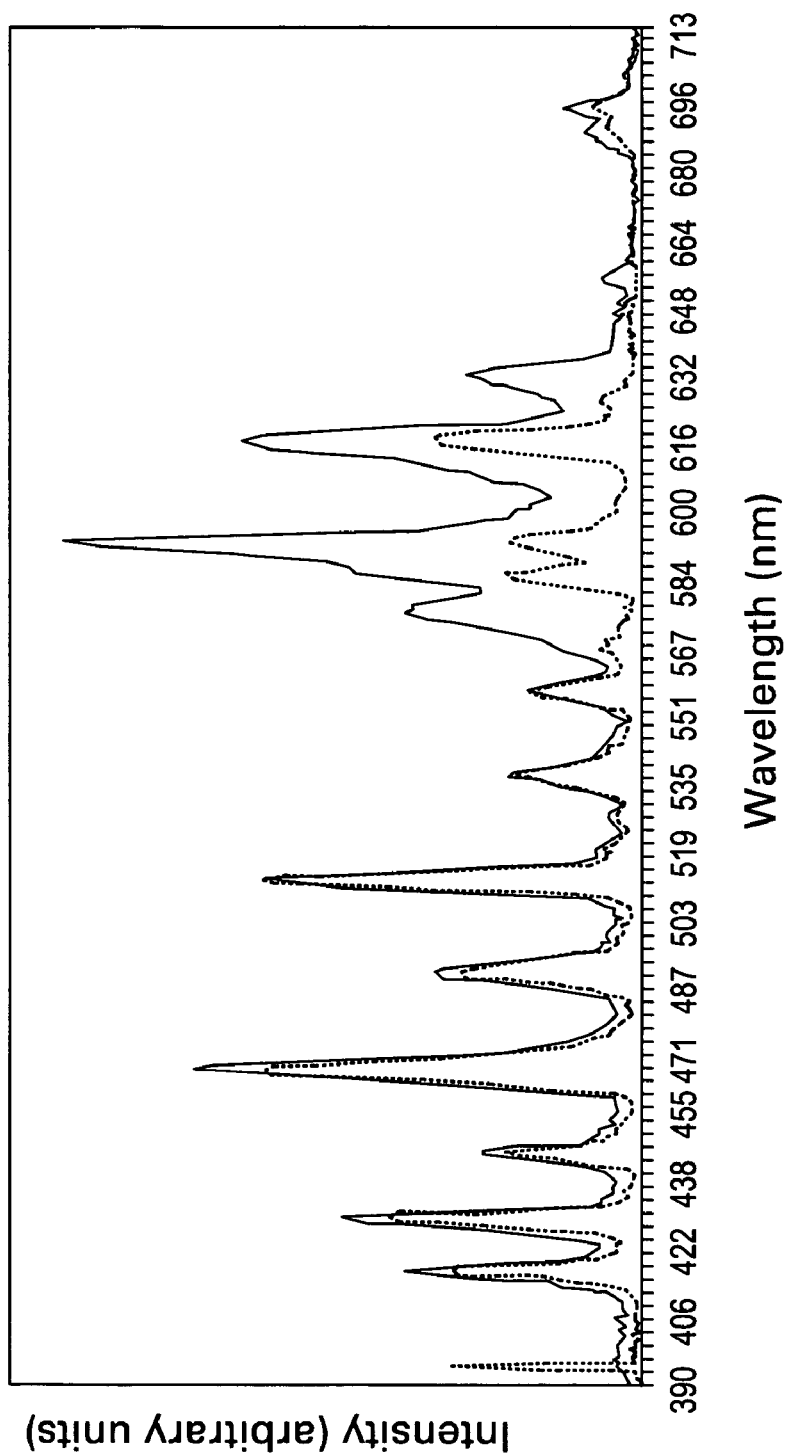
FIG. 1 shows the emission spectrum of $KGd_{0.999}Eu_{0.001}F_4$ excited at 200 nm and 270 nm.
Figure 2:
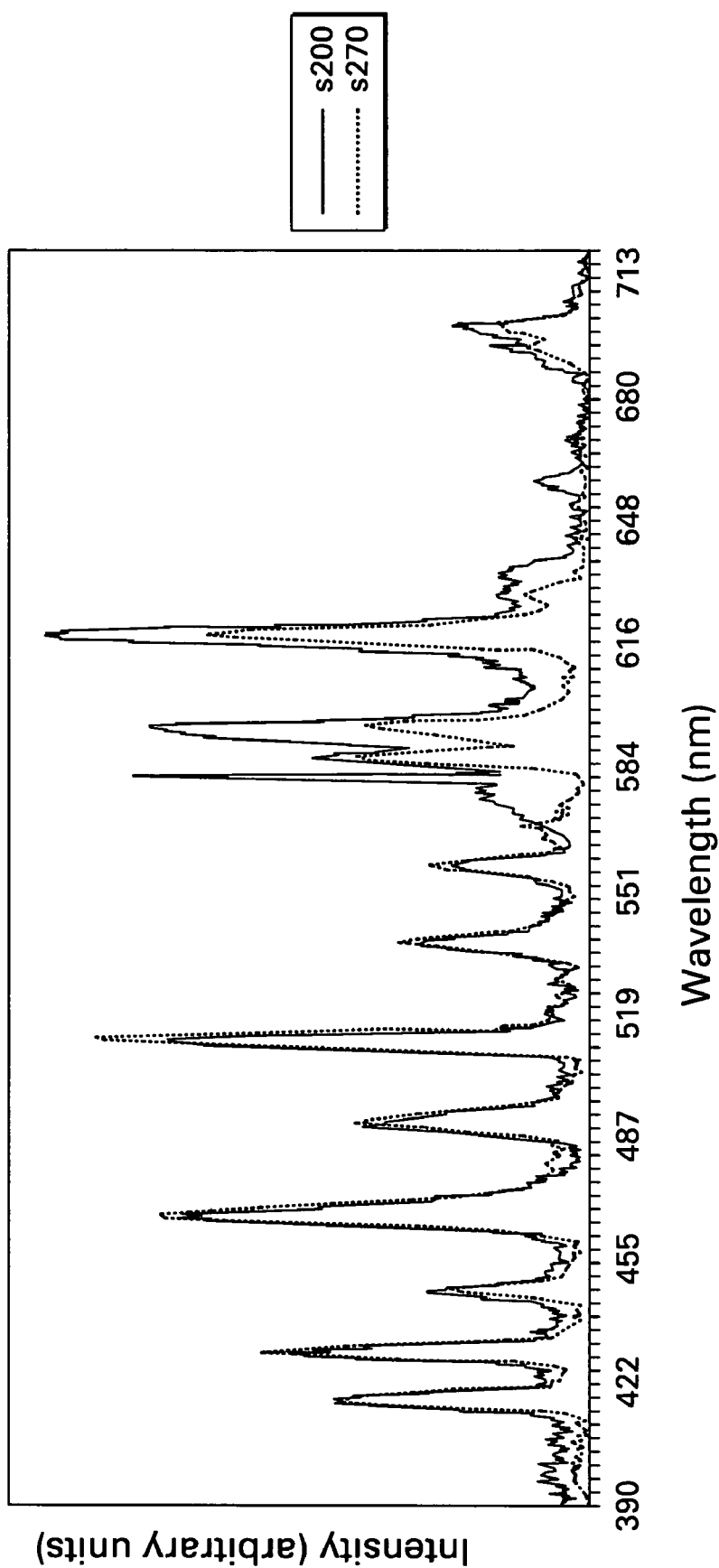
FIG. 2 shows the emission spectrum of $KGd_{0.995}Eu_{0.005}F_4$ excited at 200 nm and 270 nm.
Figure 3:
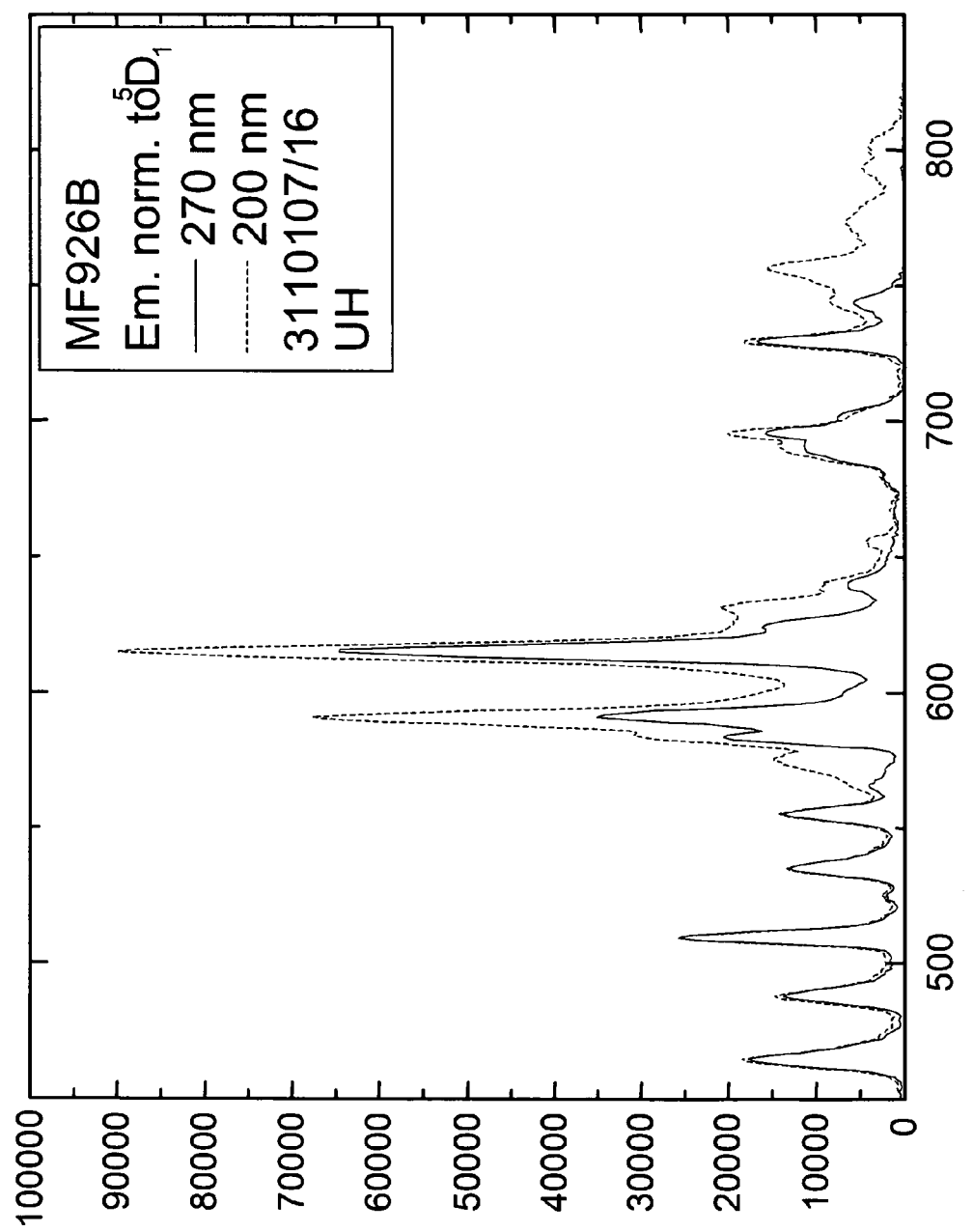
FIG. 3 shows the emission spectrum of $K_{0.995}Li_{0.005}Gd_{0.999}Eu_{0.001}F_4$ excited at 200 nm and 270 nm.
Figure 4:
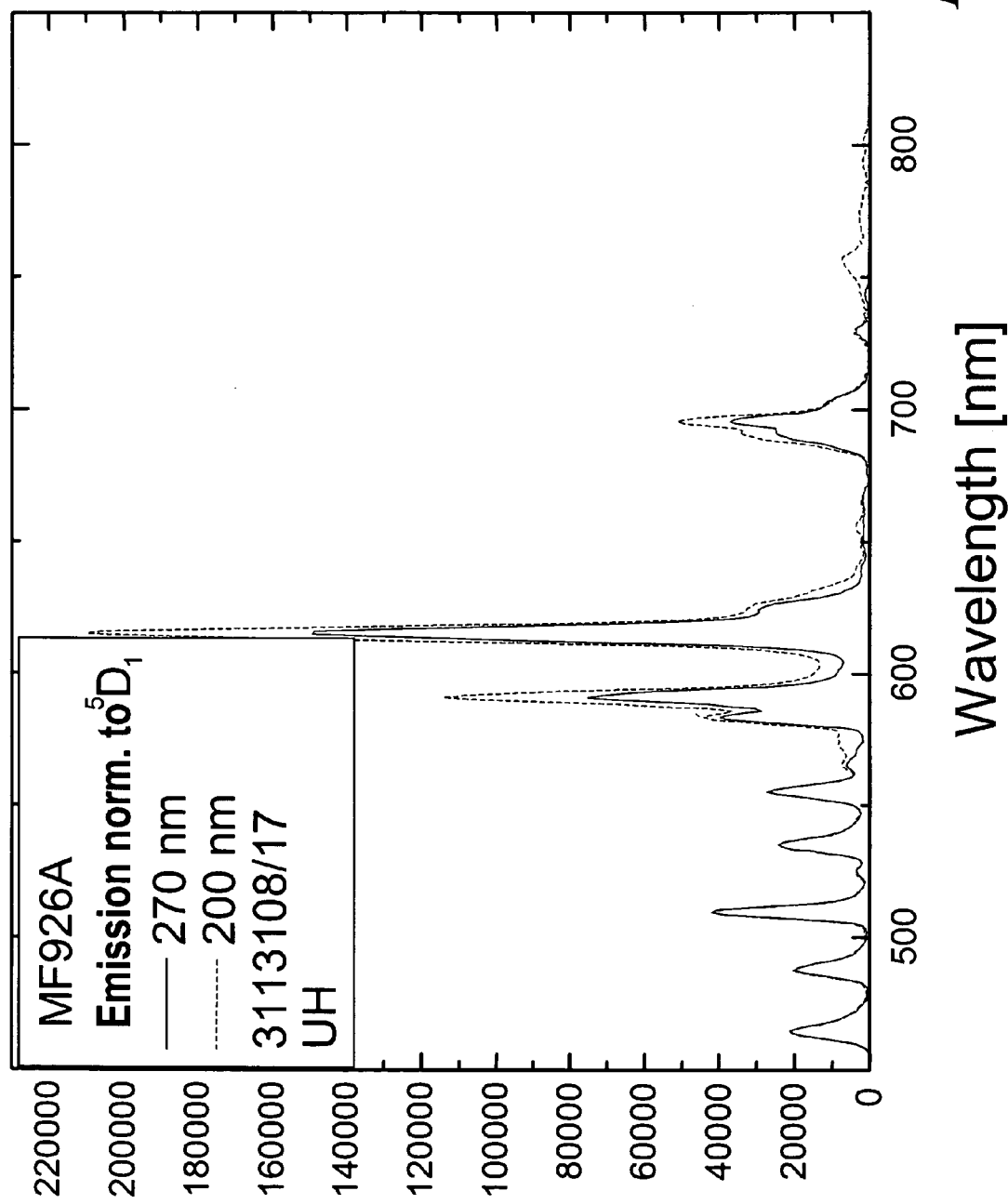
FIG. 4 shows the emission spectrum of $K_{0.999}Li_{0.001}Gd_{0.999}Eu_{0.005}F_4$ excited at 200 nm and 270 nm.

In general, the present invention provides fluoride-based phosphors comprising gadolinium and at least a first alkali metal selected from the group consisting of potassium, rubidium, cesium, and combinations thereof. The phosphors are activated with ions of at least one of the rare-earth metals other than gadolinium. It should be noted that gadolinium and the first alkali metal are present in the phosphor as ions in the phosphor host lattice.

A phosphor of the present invention exhibits quantum splitting when irradiated with vacuum ultraviolet ("VUV") radiation. In other words, the quantum efficiency of a phosphor of the present invention is greater than 100 percent. VUV radiation as used herein is radiation that has wavelength shorter than about 215 nm. Although the applicants do not wish to be bound by any one particular theory, it is believed that gadolinium ions in the host lattice are excited by VUV radiation to their $^6G_J$ states. These excited Gd ions transfer a portion of their energy to rare-earth activator ions by cross relaxation, exciting these rare-earth ions to a high energy level, which ions emit a first visible photon upon relaxing to their ground state. The remaining energy of excited gadolinium ions, after cross relaxation, is transferred to other rare-earth activator ions, which emit a second visible photon upon decaying to the ground state. Thus, a phosphor of the present invention has the ability to generate more than one photon for every incident VUV photon and, in the process, achieves quantum efficiency greater than 100 percent. One application of the phosphors of the present invention is in mercury vapor discharge lamps to provide energy-efficient light sources. Xenon discharges are typical sources of VUV radiation that can be used with a phosphor of the present invention.

In one embodiment, the rare-earth metal activator ions are selected from the group consisting of ions of europium, terbium, dysprosium, samarium, thulium, holmium, and combinations thereof. Preferably, the activator ions are selected from the group consisting of europium, terbium, dysprosium, and combinations thereof. Activator ions are present in the phosphor at a concentration in a range from about 0.01 mole percent to about 10 mole percent, preferably from about 0.1 mole percent to about 5 mole percent, and more preferably from about 0.1 mole percent to about 2 mole percent.

A phosphor of the present invention can be represented by the formula $AGdF_4:RE$; wherein A is selected from the group consisting of K, Rb, Cs, and combinations thereof; and RE is a rare-earth metal activator ion, which is disclosed above. In this formula, the activator is conventionally written after the colon. Alternatively, the formula can be written as $A(Gd_{1-x}RE_x)F_4$; wherein A and RE have the meaning disclosed above; and x is in a range from about 0.0001 to about 0.1, preferably in a range from about 0.001 to about 0.05, and more preferably from about 0.001 to about 0.02. Chemical formulae are used herein to represent materials in such a way that, whenever more than two elements are included within a parenthesis, it implies that at least one of the elements need to be present in the material.

In another embodiment, a portion of the first alkali metal is substituted with at least a second alkali metal different from the first alkali metal. The second alkali metal is different from the first alkali metal and is selected from the group consisting of Li, Na, K, Rb, Cs, and combinations thereof. Thus, a phosphor of this embodiment can be represent by the formula $(A,D)GdF_4:RE$; wherein A is selected from the group consisting of K, Rb, Cs, and combinations thereof; D is different from A and is selected from the group consisting of Li, Na, K, Rb, Cs, and combinations thereof; and RE is a rare-earth metal activator ion, which is disclosed above. Alternatively, the formula can be written as $(A_{1-y}D_y)(Gd_{1-x}RE_x)F_4$; wherein A, D, and RE have the meaning disclosed above; and x and y are independently in a range from about 0.0001 to about 0.1, preferably in a range from about 0.001 to about 0.05, and more preferably from about 0.001 to about 0.02.

In another embodiment, a portion of gadolinium ions can be substituted with at least one type of ions selected from the group consisting of scandium, yttrium, lanthanum, and combinations thereof. Such a substitution can be in a range from about 0.001 mole percent to about 20 mole percent, preferably from about 0.001 mole percent to about 10 mole percent. Thus, the formula of a phosphor of this embodiment can be written as $(A_{1-y}D_y)(Gd_{1-x-z}RE_xJ_z)F_4$; wherein A, D, and RE have the meaning disclosed above; J is selected from the group consisting of Sc, Y, La, and combinations thereof; x and y are independently in a range from about 0.0001 to about 0.1, preferably in a range from about 0.001 to about 0.05, and more preferably from about 0.001 to about 0.02; and z is in a range from about 0.00001 to about 0.2, preferably from about 0.00001 to about 0.1.

In still another embodiment, the phosphor also comprises a sensitizer selected from the group consisting of V, Nb, W, Zr, Hf, Sb, Ge, Sn, Bi, Ga, Zn, In, Cu, Ag, Er, Tm, Pr, and combinations thereof. In still another embodiment, the sensitizer replaces a portion of gadolinium. In one aspect, the sensitizer is selected from the group consisting of V, Nb, W, Zr, Hf, and combinations thereof. In another aspect, the sensitizer is selected from the group consisting of Sb, Ge, Sn, Bi, Ga, Zn, In, Cu, Ag, and combinations thereof. In still another aspect, the sensitizer is selected from the group consisting of Er, Tm, Pr, and combinations thereof. The sensitizer can be present from about 0.01 to about 5 mole percent, preferably from about 0.1 mole percent to about 2 mole percent, and more preferably from about 0.1 mole percent to about 1 mole percent. In one embodiment, the sensitizer is selected from the group consisting of Sn, Bi, and combinations thereof.

In still another aspect, a method of producing a fluoride-based quantum-splitting phosphor comprises: (a) selecting a desired final composition of the phosphor; (b) providing quantities of: (1) a fluoride of at least a first alkali metal selected from the group consisting of K, Rb, Cs, and combinations thereof; (2) fluoride of gadolinium; and (3) at least a fluoride of a rare-earth metal, which rare-earth metal acts as an activator of the final phosphor, and which quantities are sufficient to achieve the final composition of the phosphor; and (b) heating the fluorides under a vacuum or an inert atmosphere at a temperature for a time sufficient to convert the fluorides to the phosphor.

In still another aspect, the method further comprises the step of providing a quantity of a fluoride of a second alkali metal, which is different from the first alkali metal. The second alkali metal is selected from the group consisting of Li, Na, K, Rb, Cs, and combinations thereof.

The heating is carried out at a temperature in a range from about 500° C. to about 1000° C., preferably from about 500° C. to about 900° C., and more preferably from about 600° C. to about 800° C. The heating time is in a range from about 1 minute to about 10 hours. The heating may be done in any suitable high-temperature equipment in either a batch-wise or a continuous process. The step of heating can be carried out at a substantially constant temperature, or the temperature can be ramped up from ambient temperature to the final temperature with or without holding the sample at the final temperature.

In still another aspect, all of the fluorides are mixed together to form a mixture before the step of heating.

In still another aspect, the mixture is further mixed, or otherwise agitated, during the step of heating to provide a substantially uniform temperature in the solid mass.

In still another aspect, the mixture is contained in a sealed enclosure, which is then heated. The enclosure is made of a material compatible with the raw materials contained therein and is capable of withstanding the temperature at which the raw material mixture is heated. For example, the enclosure can be made of silver or platinum.

In still another aspect, the step of heating is carried out in a vacuum in a range from about $10^{-9}$ mm Hg to about 100 mm Hg, preferably from about $10^{-6}$ mm Hg to about 20 mmHg, more preferably from about $10^{-3}$ mm Hg to about 1 mm Hg.

In yet another aspect, the mixture is heated under an inert gas atmosphere selected from the group consisting of nitrogen, helium, neon, argon, krypton, xenon, and combinations thereof.

EXAMPLE 1

Manufacture of Phosphors Having Formula of $K_{1-y}Li_yGd_{1-x}Eu_xF_4$

Table 1 shows the quantities of various fluorides, the heating temperature and times used to make the indicated potassium gadolinium fluoride phosphors activated with europium.

TABLE 1

| x | y | KF (g) | LiF (g) | GdF$_3$ (g) | EuF$_3$ (g) | Heating Temperature (° C.) | Heating Time (hours) |
|---|---|---|---|---|---|---|---|
| 0.001 | 0 | 1.2782 | 0 | 4.7088 | 0.0046 | 600 | 8 |
| 0.005 | 0 | 1.2782 | 0 | 4.6899 | 0.02299 | 600 | 8 |
| 0.001 | 0.005 | 1.0620 | 0.0024 | 3.9319 | 0.0038 | 610 | 8 |
| 0.005 | 0.001 | 1.0658 | 0.0005 | 3.9146 | 0.0192 | 610 | 8 |

The fluorides were blended together in an inert gas atmosphere. The mixture was placed in a silver tube, which was evacuated to less than $10^{-6}$ mm Hg. The tube was then backfilled with argon to about 1 atmosphere and sealed. The sealed tube was heated at the indicated temperature and for the indicated time. The emission spectra for the phosphors $KGd_{0.999}Eu_{0.001}F_4$, $KGd_{0.995}Eu_{0.005}F_4$, $K_{0.995}Li_{0.005}Gd_{0.999}Eu_{0.001}F_4$, and $K_{0.999}Li_{0.001}Gd_{0.995}Eu_{0.005}F_4$ are shown in FIGS. 1, 2, 3, and 4, respectively.

EXAMPLE 2

Manufacture of Phosphors Having Formula of $Li_{1-y}Na_yGd_{1-x}Eu_xF_4$

Table 1 shows the quantities of various fluorides, the heating temperature and times used to make the indicated lithium gadolinium fluoride and lithium sodium gadolinium fluoride phosphors activated with europium.

TABLE 2

| x | y | LiF (g) | NaF (g) | GdF$_3$ (g) | EuF$_3$ (g) | Heating Temperature (° C.) | Heating Time (hours) |
|---|---|---|---|---|---|---|---|
| 0.001 | 0.005 | 0.3226 | 0.0026 | 2.6754 | 0.0026 | 680 | 5 |
| 0.005 | 0.001 | 0.3239 | 0.0005 | 2.6647 | 0.0131 | 680 | 5 |

Figure 5:
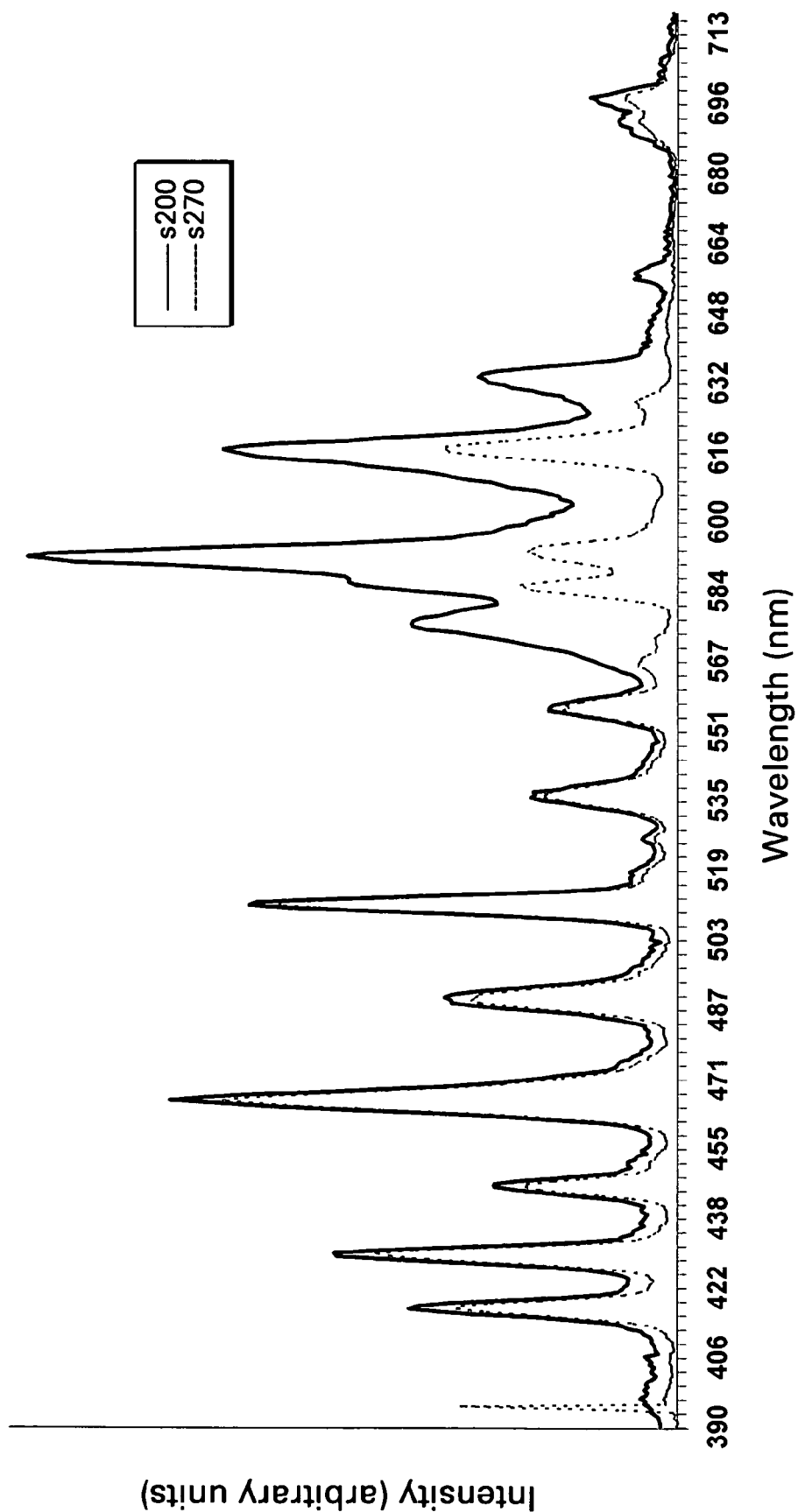
FIG. 5 shows the emission spectrum of $Li_{0.995}Na_{0.005}Gd_{0.999}Eu_{0.001}F_4$ excited at 200 nm and 270 nm.
Figure 6:
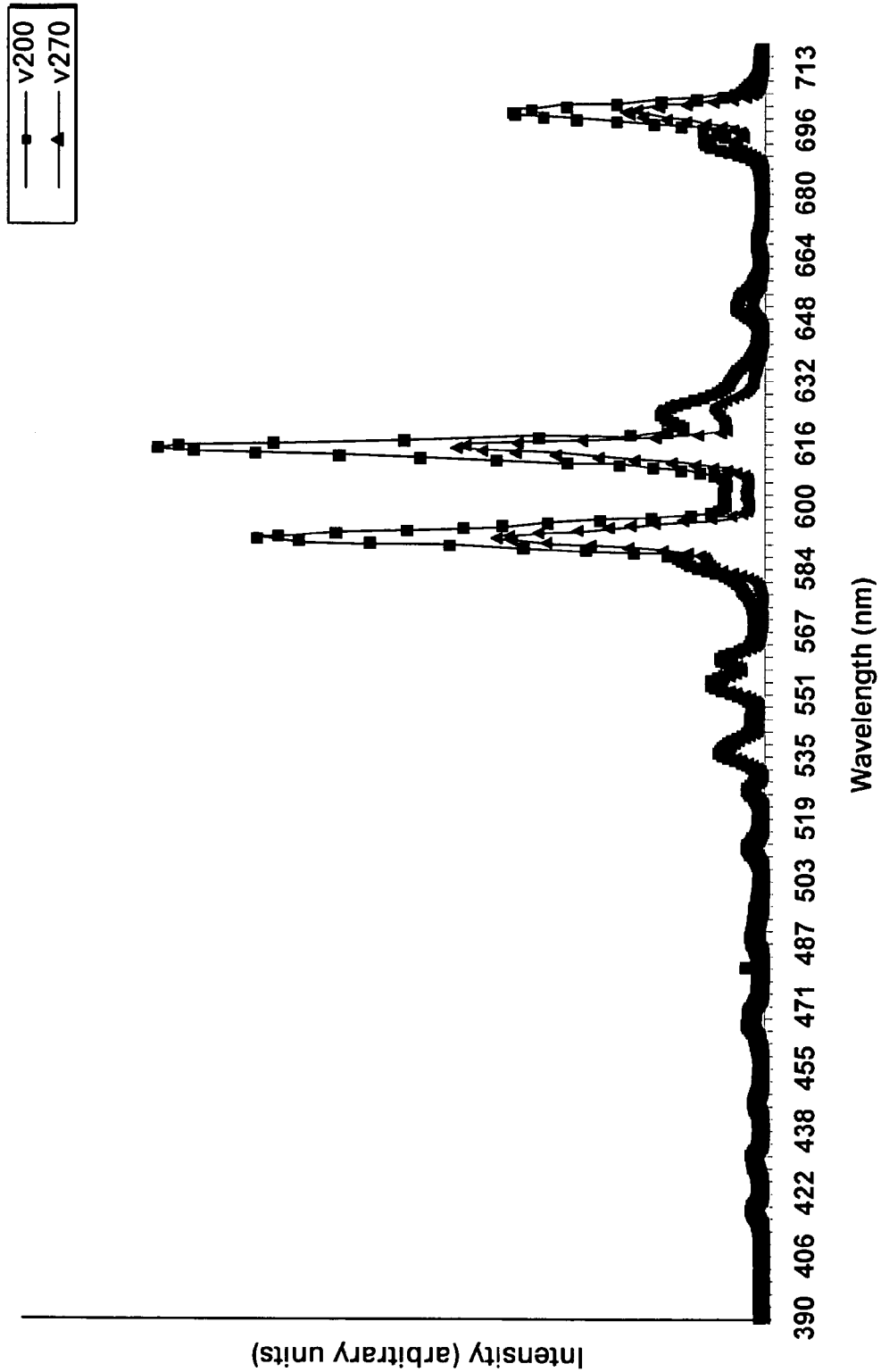
FIG. 6 shows the emission spectrum of $Li_{0.999}Na_{0.001}Gd_{0.995}Eu_{0.005}F_4$ excited at 200 nm and 270 nm.
Figure 7:
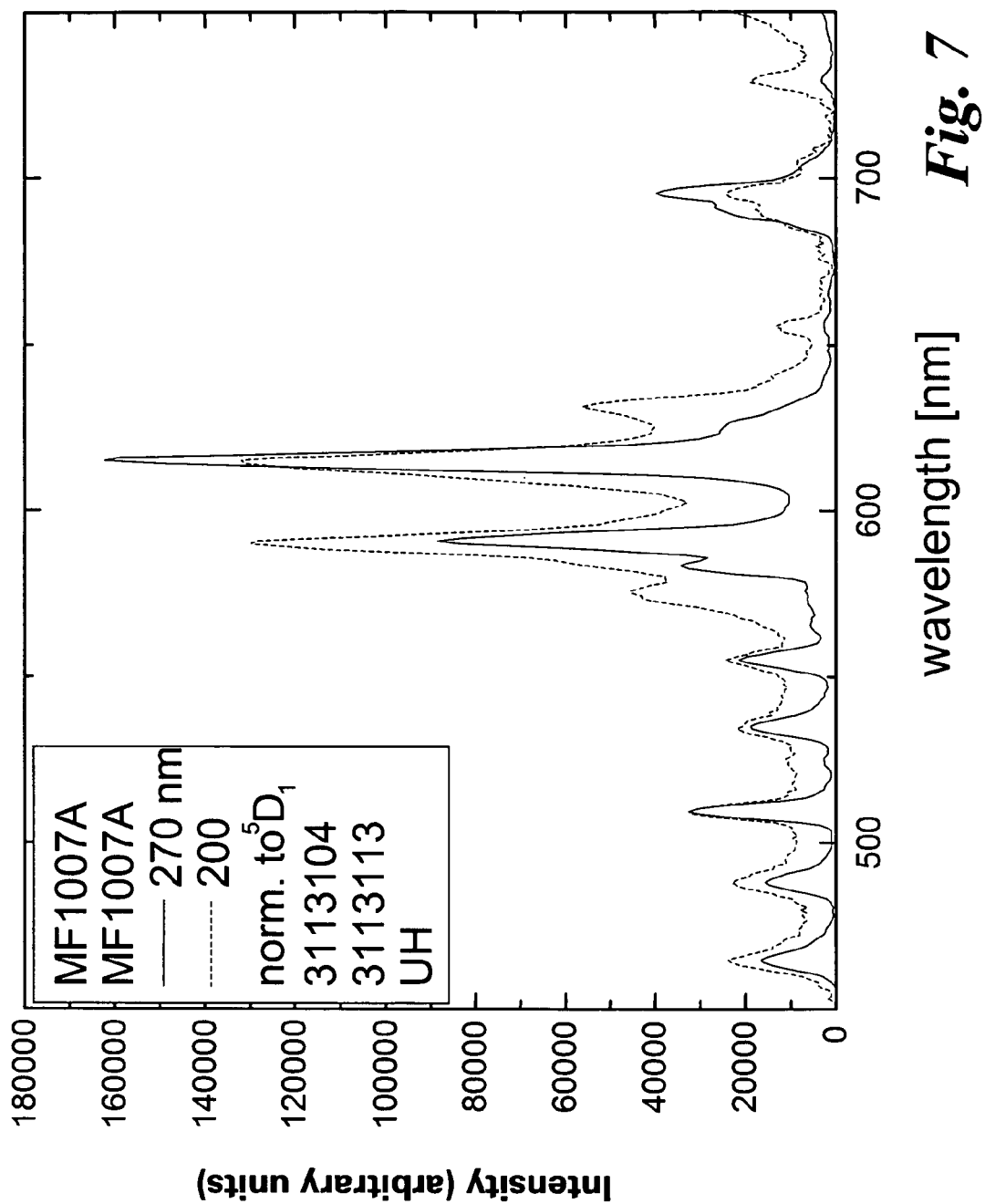
FIG. 7 shows the emission spectrum of $K_{0.999}Li_{0.001}Gd_{0.998}Eu_{0.001}Bi_{0.001}F_4$ excited at 200 nm and 270 nm.
Figure 8:
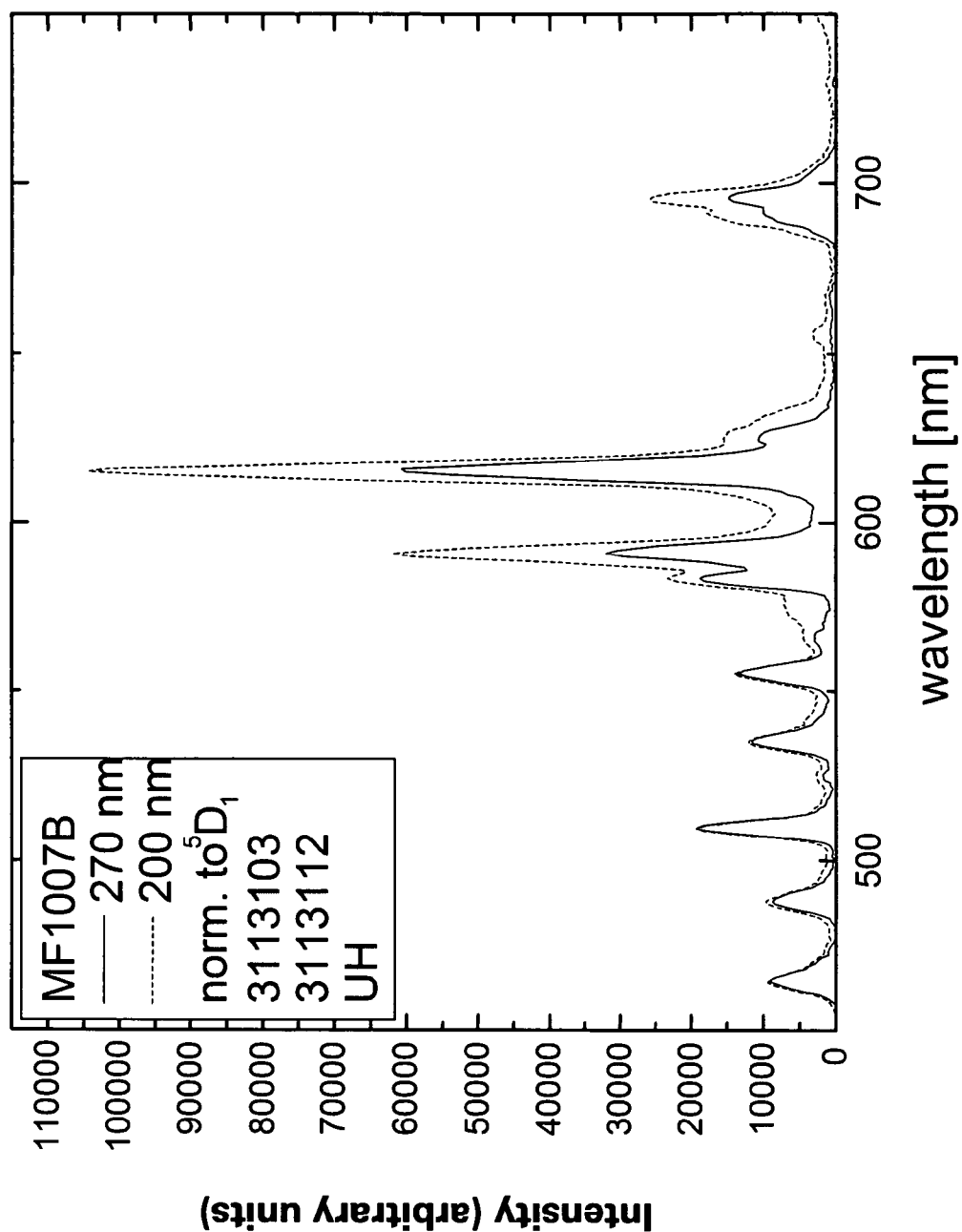
FIG. 8 shows the emission spectrum of $K_{0.995}Li_{0.005}Gd_{0.99}Eu_{0.005}Bi_{0.005}F_4$ excited at 200 nm and 270 nm.
Figure 9:
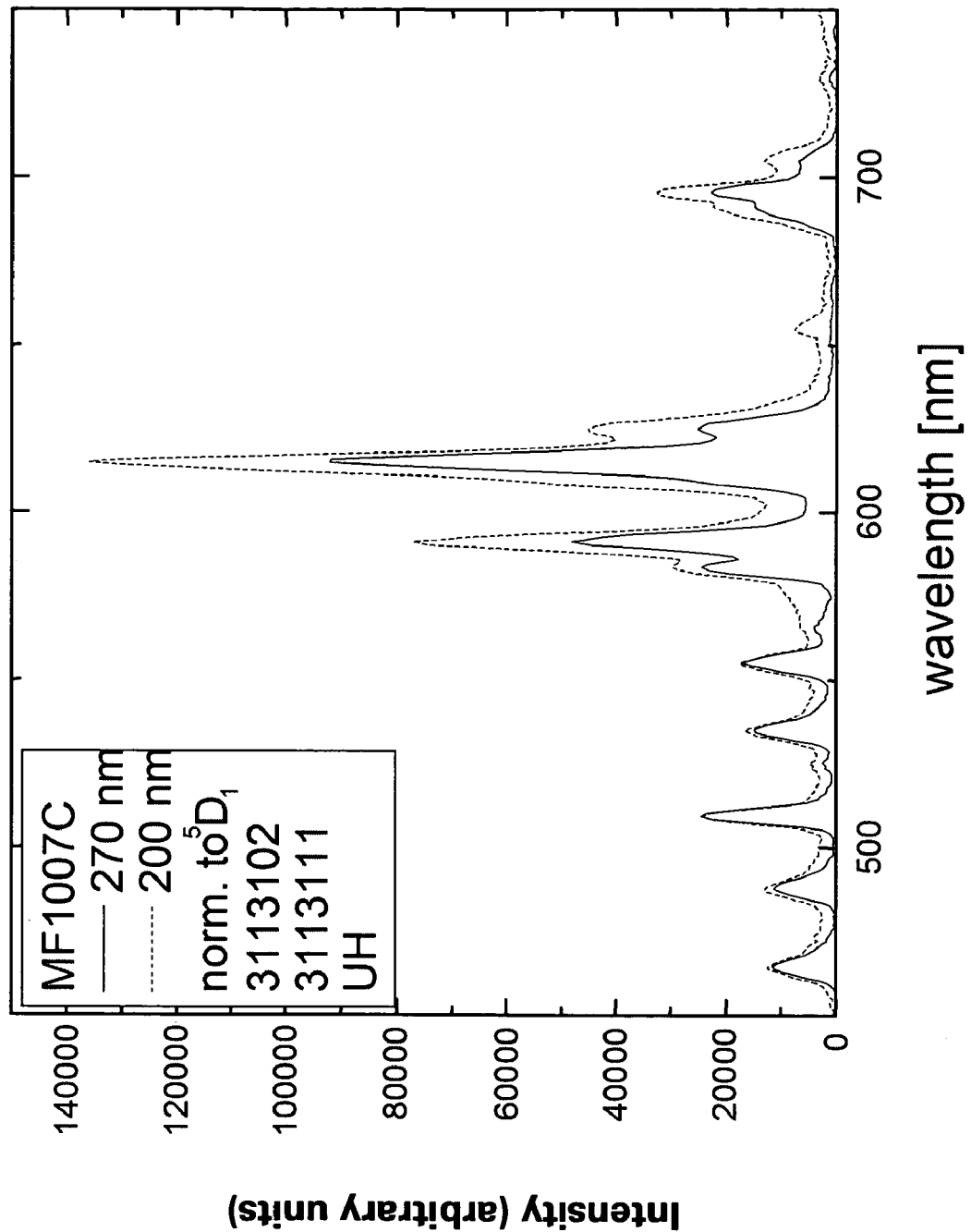
FIG. 9 shows the emission spectrum of $K_{0.995}Li_{0.005}Gd_{0.98}Eu_{0.01}Bi_{0.01}F_4$ excited at 200 nm and 270 nm.
Figure 10:
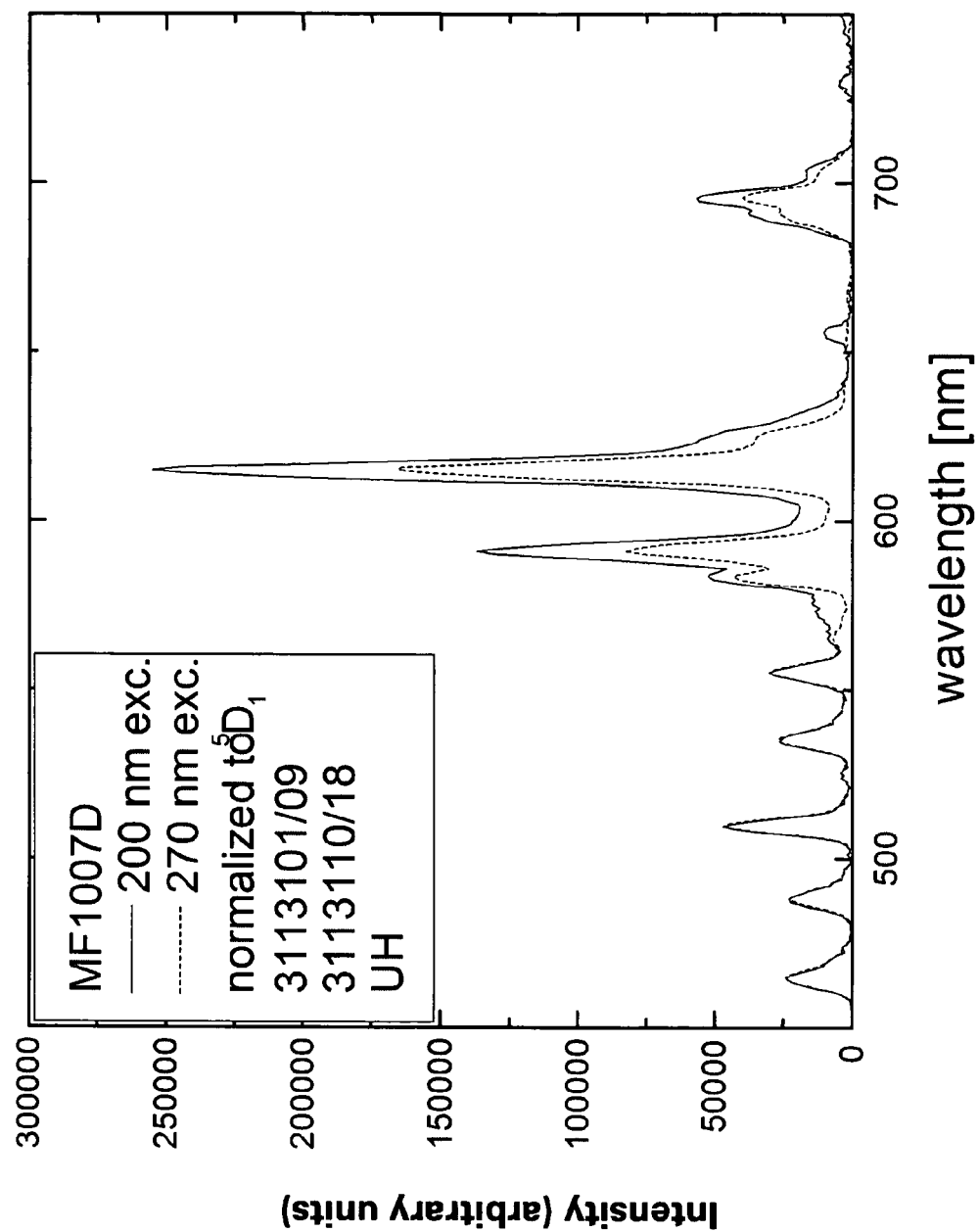
FIG. 10 shows the emission spectrum of $K_{0.995}Li_{0.005}Gd_{0.995}Eu_{0.005}Sn_{0.005}F_4$ excited at 200 nm and 270 nm.

The fluorides were blended together in an inert gas atmosphere. The mixture was placed in a silver tube, which was evacuated to less than about $10^{-6}$ mm Hg. The tube was then backfilled with an amount of argon to about 1 atmosphere, and then sealed. The amount of argon was not critical. The sealed tube was then heated at the indicated temperature and for the indicated time. The emission spectra for the phosphors $Li_{0.995}Na_{0.001}Gd_{0.999}Eu_{0.001}F_4$ and $Li_{0.999}Na_{0.001}Gd_{0.995}Eu_{0.005}F_4$ are shown in FIGS. 5 and 6, respectively.

EXAMPLE 3

Manufacture of Fluoride-Based Quantum-Splitting Phosphors Sensitized with Bi or Sn Table 3 shows the quantities of various fluorides, the heating temperature and times used to make the indicated potassium lithium gadolinium fluoride phosphors activated with europium, sensitized with Bi or Sn.

TABLE 3

| Phosphor | KF (g) | LiF (g) | GdF$_3$ (g) | EuF$_3$ (g) | BiF$_3$ or SnF$_2$ (g) | Heating Temperature (° C.) | Heating Time (hours) |
|---|---|---|---|---|---|---|---|
| KLB-1 | 1.0656 | 0.0005 | 3.9254 | 0.0038 | 0.0049 | 610 | 8 |
| KLB-2 | 1.0611 | 0.0024 | 3.8931 | 0.0192 | 0.0244 | 610 | 8 |
| KLB-3 | 1.0602 | 0.0024 | 3.8505 | 0.0383 | 0.0488 | 610 | 8 |
| KLS-1 | 1.0628 | 0.0024 | 3.8996 | 0.0192 | 0.0144 | 610 | 8 |

The chemical formulas for the phosphors are:

KLB-1: $K_{0.999}Li_{0.001}Gd_{0.98}Eu_{0.001}Bi_{0.001}F_4$

KLB-2: $K_{0.995}Li_{0.005}Gd_{0.99}Eu_{0.005}Bi_{0.005}F_4$

KLB-3: $K_{0.995}Li_{0.005}Gd_{0.98}Eu_{0.01}Bi_{0.01}F_4$

KLS-1: $K_{0.995}Li_{0.005}Gd_{0.99}Eu_{0.005}Sn_{0.005}F_4$

The fluorides were blended together in an inert gas atmosphere. The mixture was placed in a silver tube, which was evacuated to less than about $10^{-6}$ mm Hg. The tube was then backfilled with an amount of argon to about 1 atmosphere, and sealed. The sealed tube was then heated at the indicated temperature and for the indicated time. The emission spectra for the phosphors KLB-1, KLB-2, KLB-3, and KLS-1 are shown in FIGS. 7, 8, 9, and 10, respectively.

The method of manufacture of the present invention is an advance over the prior-art method of manufacture of solid-state fluoride materials. One prior-art method of producing a solid-state fluoride material involves treating a mixture of oxides of the chosen metals under a flow of twice-distilled HF gas. Such prior-art method requires a high degree of precaution in designing the apparatus for safe handling of HF gas, thus resulting in high cost of producing large amounts of materials. The method of the present invention does not require the use of HF gas, thus lowering the risk of leakage of this hazardous material into the surroundings. In addition, the mixture is contained in a sealed silver tube, which can be recycled and reused. The solid state method of the present invention is also easily scaled up.

White Light-Emitting Device

Figure 11:
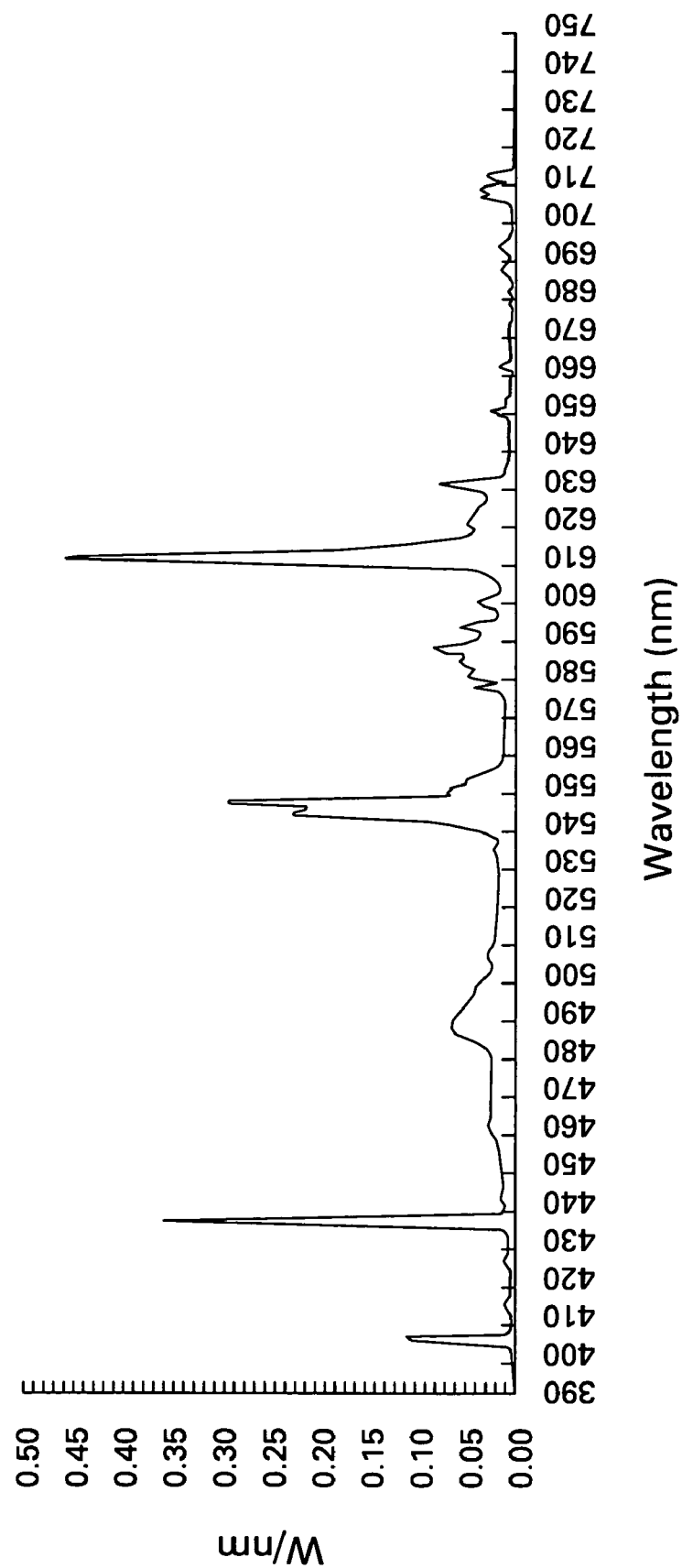
FIG. 11 shows the emission spectrum of a blend consisting of $KGd_{0.995}Eu_{0.005}F_4$; $(Ba,Sr,Ca)MgAl_{10}O_{17}:Eu^{2+}$; $LaPO_4:Ce^{3+},Tb^{3+}$; and $Y_2O_3:EU^{3-}$.

Incorporation of a blend of phosphors that comprises a quantum-splitting phosphor of the present invention (as has been disclosed herein above), a green light-emitting phosphor, a blue light-emitting phosphor, and optionally an additional red light-emitting phosphor, in a mercury discharge device provides a white light-emitting device that can have a correlated color temperature ("CCT") in the range of 2500-10000 K, a CRI in the range of 80-95, and a high luminous output. The quantum-splitting phosphor in this blend advantageously absorbs the 185 nm emission of mercury discharge to emit in the visible range, thus increasing the energy efficiency of the mercury discharge device. For example, a blend of phosphors consisting of $KGd_{0.995}Eu_{0.005}F_4$ (a phosphor of the present invention); $(Ba,Sr,Ca)MgAl_{10}O_{17}:Eu^{2+}$ (blue light-emitting); $LaPO_4:Ce^{3+},Tb^{3+}$ (green light-emitting); and $Y_2O_3:Eu^{3+}$ (red light-emitting) produces a composite spectrum shown in FIG. 11. The proportions of the individual phosphors are such that 6.4, 31.8, 28.5, and 33.3% of the composite spectrum are contributed by the phosphors $KGd_{0.995}Eu_{0.005}F_4$; $(Ba,Sr,Ca)MgAl_{10}O_{17}:Eu^{2+}$; $LaPO_4:Ce^{3+},Tb^{3+}$; and $Y_2O_3:Eu^{3+}$; respectively. This phosphor blend produces white light having a CCT of 4000 K, a CRI of 91.2, and a luminous output of 326.4 lumen/W of radiant energy.

Figure 12:
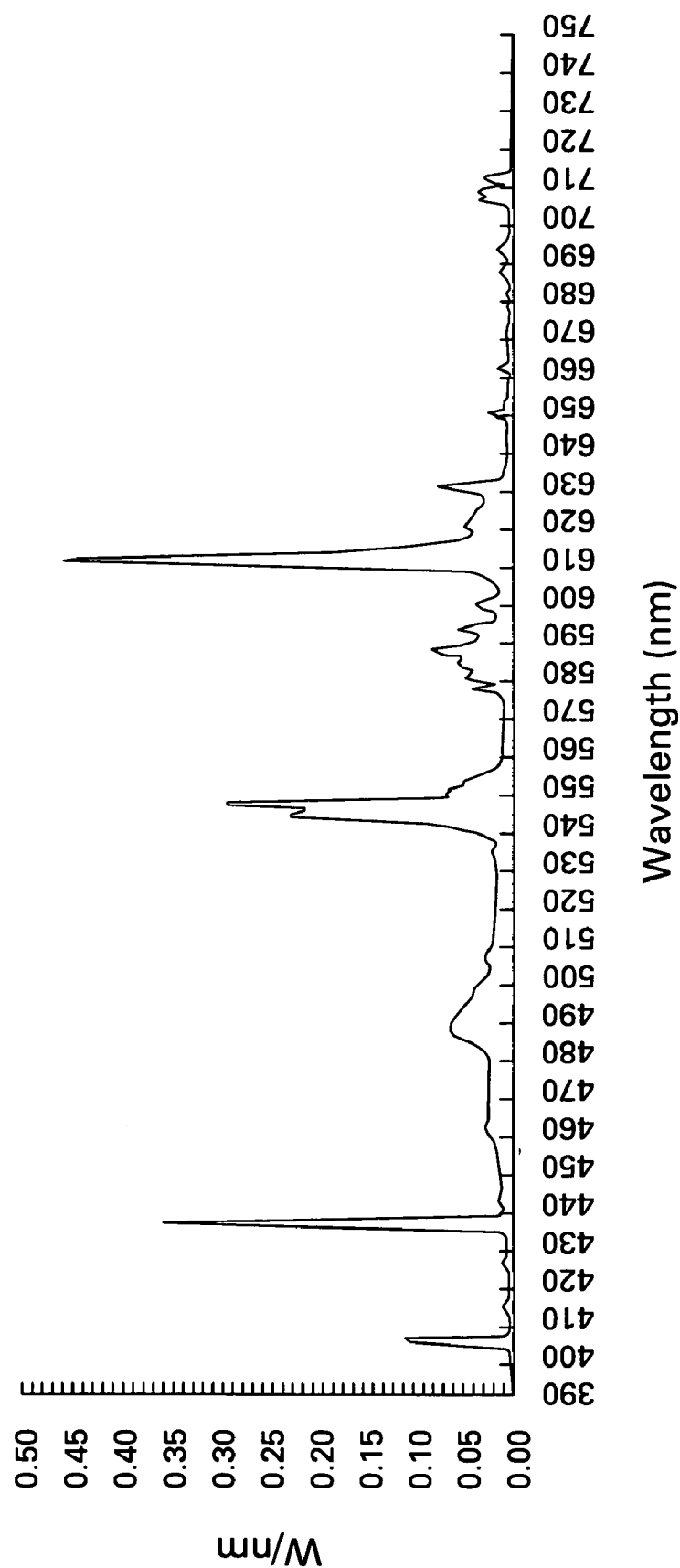
FIG. 12 shows the emission spectrum of a blend consisting of $K_{0.999}Li_{0.001}Gd_{0.998}Eu_{0.001}Bi_{0.001}F_4$; $(Ba,Sr,Ca)MgAl_{10}O_{17}:Eu^{2+}$; $LaPO_4:Ce^{3+},Tb^{3+}$; and $Y_2O_3:Eu^{3+}$.

Another blend of phosphors consisting of $K_{0.999}Li_{0.001}Gd_{0.998}Eu_{0.001}Bi_{0.001}F_4$ (a phosphor of the present invention); $(Ba,Sr,Ca)MgAl_{10}O_{17}:Eu^{2+}$ (blue light-emitting); $LaPO_4:Ce^{3+},Tb^{3+}$ (green light-emitting); and $Y_2O_3:Eu^{3+}$ (red light-emitting) produces a composite spectrum shown in FIG. 12. The proportions of the individual phosphors are such that 6.4, 31.8, 28.5, and 33.3% of the composite spectrum are contributed by the phosphors $K_{0.999}Li_{0.001}Gd_{0.998}Eu_{0.001}Bi_{0.001}F_4$; $(Ba,Sr,Ca)MgAl_{10}O_{17}:Eu^{2+}$; $LaPO_4:Ce^{3+},Tb^{3+}$; and $Y_2O_3:Eu^{3+}$; respectively. This phosphor blend also produces white light having a CCT of 4000 K, a CRI of 91.2, and a luminous output of 326.4 lumen/W of radiant energy.

Green light-emitting phosphors used in a phosphor blend of the present invention preferably emit light having a peak emission in the range from about 500 nm to about 560 nm. Blue light-emitting phosphors used in a phosphor blend of the present invention preferably emit light having a peak emission in the range from about 420 nm to about 500 nm. Red light-emitting phosphors used in a phosphor blend of the present invention preferably emit light having a peak emission in the wavelength range from about 600 nm to about 625 nm.

Non-limiting examples of other green light-emitting phosphors are $GdMgB_5O_{10}:Ce^{3+},Tb^{3+}$; $CeMgAl_{11}O_{19}:Ce^{3+}$, $Tb^{3+}$; $Ca_5(PO_4)_3(Cl,F,OH):Sb^{3+},Mn^{2+},Eu^{2+}$; $Sr_4Al_{14}O_{25}:Eu^{2+}$; and $BaAl_8O_{13}:Eu^{2+}$; and combinations thereof.

Non-limiting examples of blue light-emitting phosphors are $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; and combinations thereof.

Non-limiting examples of blue-green light-emitting phosphors are $BaAl_8O_{13}:Eu^{2+}$; $2SrO.0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$.

Non-limiting examples of other red light-emitting phosphors are $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)AlO_9:Eu^{3+}$; $(Sr,Mg)_3(PO_4)_2:Sn^{2+}$; $GdMgB_5O_{10}:Ce^{3+},Mn^{2+}$; and $3.5MgO.0.5MgF_2.GeO_2:Mn^{4+}$.

Figure 13:
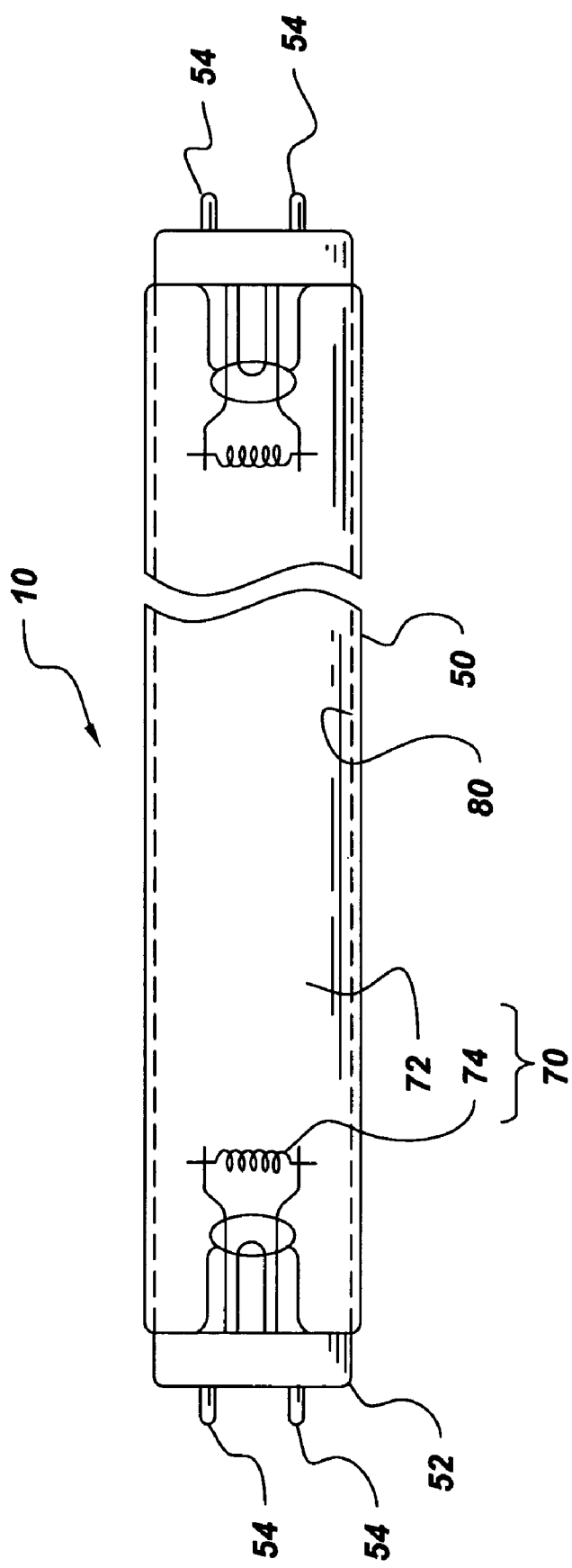
FIG. 13 is a schematic illustration of a lamp incorporating a phosphor of the present invention.

In one embodiment of the present invention, a light source 10, which produces white light with a high CRI suitable for general illumination (e.g., CRI in the range from about 80 to about 100), is shown in FIG. 13. Light source 10 comprises an evacuated sealed housing 50, a means 70 for generating at least VUV radiation, which means is located within housing 50, and a phosphor blend 80 located within housing 50 and adapted to be excited by at least VUV radiation. In one embodiment, light source 10 is a fluorescent lamp and evacuated housing 50 comprises an evacuated glass tube and associated end caps 52. In another embodiment, the phosphor blend is disposed on an inner surface of housing 50. Means 70 for generating at least UV radiation is a combination of a gas comprising a means 74 for generating high-energy electrons and a means 72 for absorbing the energy of the high-energy electrons. In one embodiment, means 72 for absorbing energy of high-energy electrons is a gas comprising mercury vapor, which absorbs energy of the high-energy electrons to create a mercury vapor discharge to excite the phosphor. In addition to mercury vapor, the gas can comprise an inert gas such as argon, krypton, or xenon. Means 74 for generating high-energy electrons may be a filament of a metal having a low work function (such as less than 4.5 eV), such as tungsten, or such a filament coated with alkaline earth metal oxides as are known in the art. In such an embodiment, the mercury discharge emits both VUV and UV radiation. Pins 54 are provided to supply electrical power to electron-generating means 74. The filament is coupled to a high-voltage source to generate electrons from the surface thereof. A phosphor of the present invention may be used in combination with other conventional phosphors used in fluorescent lighting technology. For example, a phosphor of the present invention may be combined with conventional red, green, and blue light-emitting phosphors, which conventional phosphor are disclosed herein above, to produce white light from a mercury discharge lamp. A particulate material comprising $TiO_2$ and/or $Al_2O_3$ can be used in conjunction with the phosphor blend to scatter light generated by light source 10. Such a light scattering material can be blended into the phosphor blend or disposed as a layer between the inner surface of housing 50 and phosphor layer 80. Although light source 10 shown in FIG. 4 comprises a straight housing 50, it should be understood that other housing shapes also are applicable. For example, a compact fluorescent lamp can have a housing that has one or more bends, and electrical supply pins 54 are disposed at one end of light source 10.

Another light source that can incorporate a phosphor or phosphor blend of the present invention is based on cathode discharges in rare gases such as xenon, krypton, and argon.

Figure 14:
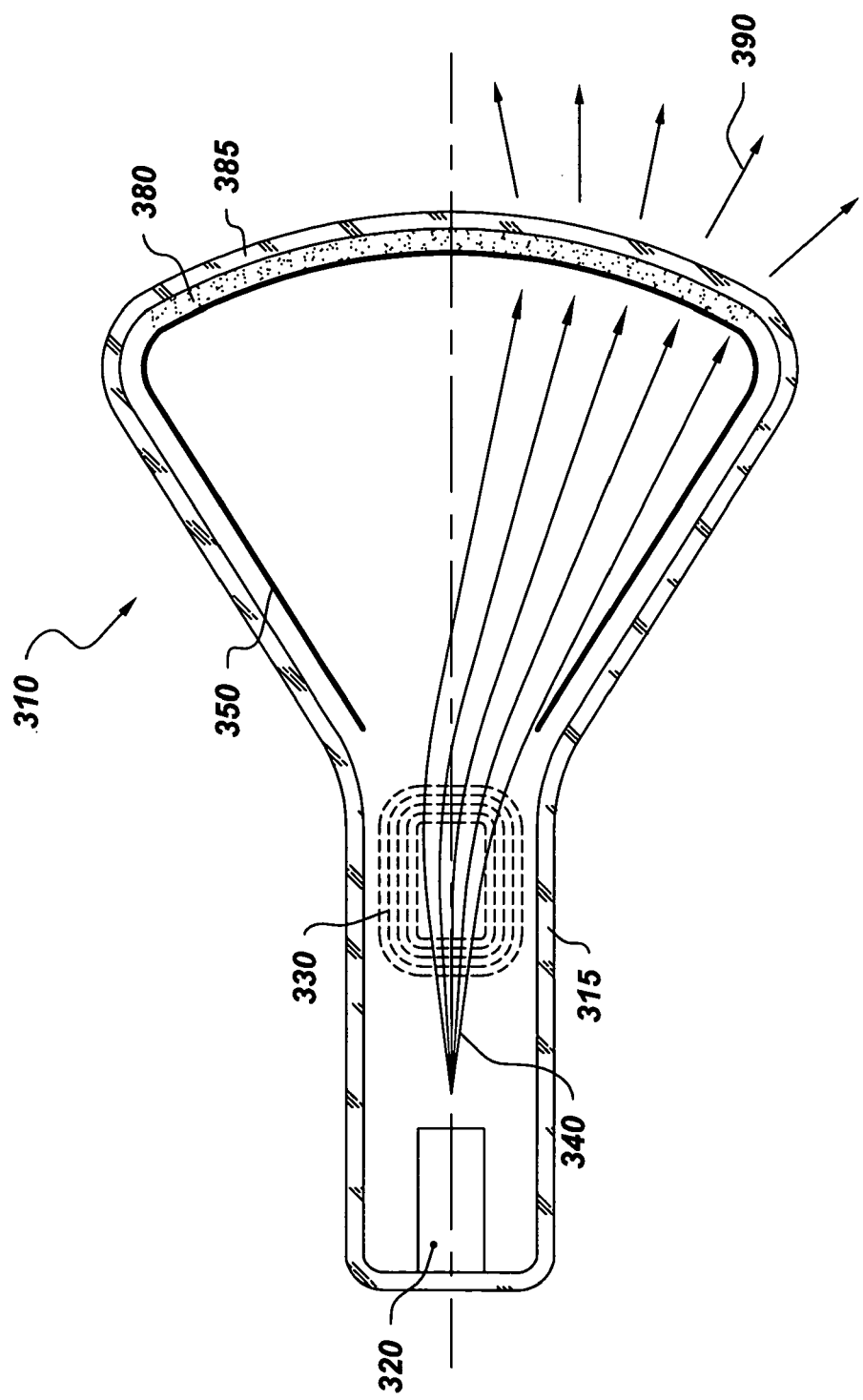
FIG. 14 is a schematic illustration of a display incorporating a phosphor of the present invention.

A quantum-splitting phosphor of the present invention also can be used alone or as a component of a phosphor blend for displays or cathode-ray tubes, which phosphor blend comprises blue light-emitting and green light-emitting phosphors. In this case, the high-energy electrons from an electron source bombard a screen on which a coating of the phosphor or phosphor blend is disposed to emit light in the visible spectral region For example, FIG. 14 shows schematically a display 310 that uses a phosphor of the present invention, singly or in combination with other phosphors. Display 310 comprises a sealed housing 315, wherein an electron gun 320 is located. Electron gun 320 produces a beam 340 of high-energy electrons, which is deflected by an electromagnetic field produced by system 330. Deflected electrons accelerate toward anode 350 and impinge on a phosphor layer 380, which is disposed on an internal surface of display screen 385 to excite the phosphor in layer 380 to produce visible light 390. Phosphor layer 380 comprises at least a phosphor of the present invention. Preferably, phosphor layer 380 also comprises other phosphors emitting other primary colors to provide a color display. The phosphor material further comprises at least a second phosphor selected from the group consisting of $LaPO_4:Ce^{3+},Tb^{3+}$; $GdMgB_5O_{10}:Ce^{3+}$, $Tb^{3+}$; $CeMgAl_{11}O_{19}:Ce^{3+},Tb^{3+}$; $Ca_5(PO_4)_3(Cl,F,OH):Sb^{3+},Mn^{2+}$, $Eu^{2+}$; $Sr_4Al_{14}O_{25}:Eu^{2+}$; and $BaAl_8O_{13}:Eu^{2+}$; $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2}$; $BaAl_8O_{13}:Eu^{2+}$; $2SrO.84P_2O_5.0.16B_2O_3:Eu^{2+}$; $MgWO_4$; $BaTiP_2O_8$; $(Ba,Sr,Ca,)MgAl^{10}O_{17}:Eu^2,Mn^{2+}$; $(Ba,Sr,Ca,)_5(PO_4)_3(Cl,F,OH):Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+};(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,.Si)AlO_9:Eu^{3+}$; $(Sr,Mg)_3(PO_4)_2:Sn^{2+}$; $GdMgB_5O_{10}:Ce^{3+}$, and $3.5MgO·0.5MgF_2·GeO_2:Mn^{4+}$: and $Y_2O_3:Eu^{3+}$. In a particular embodiment, the phosphor material further comprises $(Ba,Sr,Ca)MgAl_{10} O_{17} :Eu^{2+};LaPO_4:Ce^{3+},Tb^{3+}$ and $Y_2O_3:Eu^{3+}$.

While specific preferred embodiments of the present invention have been described in the foregoing, it will be appreciated by those skilled in the art that many modifications, substitutions, or variations may be made thereto without departing from the spirit and scope of the invention as defined in the appended claims.

The invention claimed is:

1. A phosphor comprising a material having a formula of $AGdF_4$:RE, wherein A is a first alkali metal and is selected from the group consisting of K, Rb, Cs, and combinations thereof; RE is at least a rare-earth metal activator other than gadolinium; and an additional metal selected from the group consisting of V, Nb, W, Zr, Hf, and combinations thereof.

2. The phosphor of claim 1, wherein the rare-earth metal activator is selected from the group consisting of europium, terbium, dysprosium, samarium, thulium, holmium, and combinations thereof.

3. The phosphor of claim 1, wherein the rare-earth metal activator is europium.

4. The phosphor of claim 1, wherein the activator is present at a concentration in a range from about 0.01 mole percent to about 10 mole percent.

5. The phosphor of claim 1, wherein the activator is present at a concentration in a range from about 0.1 mole percent to about 5 mole percent.

6. The phosphor of claim 1, wherein the first alkali metal is partially substituted with a second alkali metal that is selected from the group consisting of lithium, sodium, potassium, rubidium, cesium, and combinations thereof.

7. The phosphor of claim 6, wherein the phosphor has a formula of $(A_{1-y}D_y)(Gd_{1-x}RE_x)F_4$; wherein A is the first alkali metal, D is the second alkali metal, RE is the activator; and x and y are independently in a range from about 0.0001 to about 0.1.

8. The phosphor of claim 6, wherein x and y are independently in a range from about 0.001 to about 0.05.

9. A phosphor blend comprising:
(a) a first phosphor having a formula of $AGdF_4$:RE, wherein A is a first alkali metal and is selected from the group consisting of K, Rb, Cs, and combinations thereof; and RE is at least a rare-earth metal activator other than gadolinium; and an additional metal selected from the group consisting of V, Nb, W, Zr, Hf, and combinations thereof;
(b) at least a second phosphor selected from the group consisting of $LaPO_4:Ce^{3+},Tb^{3+}$; $GdMgB_5O_{10}:Ce^{3+}$, $Tb^{3+}$; $CeMgAl_{11}O_{19}:Ce^{3+},Tb^{3+}$; $Ca_5(PO_4)_3(Cl,F,OH):Sb^{3+},Mn^{2+}$, $Eu^{2+}$; $Sr_4Al_{14}O_{25}:Eu^{2+}$; $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $BaAl_8O_{13}:Eu^{2+}$ $2SrO0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)AlO_9:Eu^{3+}$; $(Sr,Mg)_3(PO_4)_2:Sn^{2+}$; $GdMgB_5O_{10}:Ce^{3+},Mn^{2+}$; and $3.5MgO0.5MgF_2.GeO_2:Mn^{4+}$.

10. The phosphor blend of claim 9, wherein said at least a second phosphor comprises a combination of $LaPO_4:Ce^{3+}$, $Tb^{3+}$; $Y_2O_3:Eu^{3+}$; and $(Ba,Sr,Ca)MgAl_{10}O_{17}:Eu^{2+}$.

11. A phosphor blend comprising;
(a) a first phosphor having a formula of $(A_{1-y}D_y)(Gd_{1-x}RE_x)F_4$; wherein A is a first alkali metal selected from the group consisting of K, Rb, Cs, and combinations thereof; D is a second alkali metal selected from the group consisting of Li, Na, K, Rb, Cs, and combinations thereof; RE is a rare-earth metal activator, and an additional metal selected from the group consisting of V, Nb, W, Zr, Hf, and combinations thereof; and x and y are independently in a range from about 0.0001 to about 0.1;
(b) at least a second phosphor selected from the group consisting of $LaPO_4:Ce^{3+},Tb^{3+}$; $GdMgB_5O_{10}:Ce^{3+}$, $Tb^{3+}$; $CeMgAl_{11}O_{19}:Ce^{3+},Tb^{3+}$; $Ca_5(PO_4)_3(Cl,F,OH):Sb^{3+},Mn^{2+},Eu^{2+}$; $Sr_4Al_{14}O_{25}:Eu^{2+}$; $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $BaAl_8O_{13}:Eu^{2+}$; $2SrO0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^3$; $(Y,Gd,La,Lu,Sc)_2O_3:Eu^{3+}$; $(Y,Gd,La,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3Ge,Si)AlO_9:Eu^{3+}$; $(Sr,Mg)_3(PO_4)_2:Sn^{2+}$; $_9:Eu^{3+}(Sr,Mg)_3(PO_4)_2GdMgB_5O_{10}:CE^{3+},Mn^{2+}$; and $3.5MgO0.5MgF_2. GeO_2:Mn^{4+}$.

12. A light source comprising:
(a) a source of UV radiation that is located in a sealed housing, said UV radiation including a portion in a VUV range; and
(b) a phosphor material disposed within the sealed housing and adapted to be excited by the UV radiation and to emit visible light, wherein the phosphor material comprises a first phosphor having a formula of $AGdF_4$:

RE, wherein A is a first alkali metal and is selected from the group consisting of K, Rb, Cs, and combinations thereof; and RE is at least a rare-earth metal activator other than gadolinium; and an additional metal selected from the group consisting of V, Nb, W, Zr, Hf, and combinations thereof.

13. The light source of claim 12, wherein the phosphor material further comprises at least a second phosphor selected from the group consisting of $LaPO_4:Ce^{3+},Tb^{3+}$; $GdMgB_5O_{10}:CeMgAl_{11}O_{19}:Ce^{3+}Tb^{3+}$; $Ca_5(PO_4)_3(Cl,F,OH):Sb^{3+,Mn2+},Eu^{2+}$; $Sr_4Al_{14}O_{25}:Eu^{2+}$; $(Ba,Sr,Ca)_5(PO_4)_3(Cl,F,OH):Eu^{2+}$; $(Ba,Sr,Ca)MgAl_{10}O_{17}:Eu^{2+}$; $Ba,Sr,Ca)BPO_5: Eu^{2+}$; $(Ba,Sr,Ca)(Y,Gd,La,Lu,Sc)_2O_3:Eu^{3+}$; $(Y,Gd,La)(Al,Ga)O_3:Eu^{3+}$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$; $(Y,Gd,La,Lu,Sc)_2O_3:Eu^{3+}$; $(Y,Gd,La,In,Lu,Sc)BO_3:Eu^{3+}$; monoclinic $Gd_2O_3:Eu^{3+}$; $(Gd,Y)_4(Al,Ga)_2O_9:Eu_{3+}$; $(Ca,Sr)(Gd,Y)_3(Ge,Si)AlO_9:Eu^{3+}$; $(Sr,Mg)_3(PO_4)_2:Sn^{2+}GdMgB_5O_{10}:Ce^{3+},Mn^{2+}$; and $3.5MgO. 0.5MgF_2.GeO_2:Mn^{4+}$.

14. The light source of claim 12, wherein the phosphor material further comprises $(Ba,Sr,Ca)MgAl_{10}O_{17}:Eu^{2+}$; $LaPO_4;Ce^{3+},Tb^{3+}$ and $Y_2O_3:Eu^{3+}$.

15. A display comprising:
(a) a source of electrons; and
(b) a phosphor material disposed within the sealed housing and adapted to be excited by the electrons and to emit visible light, wherein the phosphor material comprises a first phosphor having a formula of $AGdF_4:RE$, wherein A is a first alkali metal and is selected from the group consisting of K, Rb, Cs, and combinations thereof; and RE is at least a rare-earth metal activator other than gadolinium; and an additional metal selected from the group consisting of V, Nb, W, Zr, Hf, and combinations thereof.

16. The display of claim 15, wherein the phosphor material further comprises at least a second phosphor selected from the group consisting of $LaPO_4:Ce^{3+},Tb^{3+}$; $GdMgB_5O_{10}:Ce^{3+},Tb^{3+};CeMgal_{11}O_{19}:Ce^{3+},Tb^{3+}$; $Ca_5(PO_4)_3(Cl,F,OH):Sb^{3+},Mn^{2+},Eu^{2+}$; $Sr_4Al_{14}O_{25}:Eu^{2+}$; $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $BaAl_8O_{13}:Eu^{2+}$; $2SrO0.84P_2O_50.16B_2O_3:Eu^{2+}$; $MgWO_4$; $BaTiP_2O_8(Ba,Sr,Ca)(Y,Gd,La,Lu)_2O_4:Eu^{3+}$; $(Y,Gd,La,In,Lu,Sc)BO_3:Eu^{3+}$; $GdMgB_5O_{10}:Ce^{3+},Mn^{2+}$; and $3.5MgO0.5MgF_2\cdot GeO_2:Mn^{4+}$.

17. The display of claim 15, wherein the phosphor material further comprises $(Ba,Sr,Ca)MgAl_{10}O_{17}:Eu^{2+}$; $LaPO_4:Ce^{3+},Tb^{3+}$ and $Y_2O_3:Eu^{3+}$.

* * * * *